Jan. 20, 1970          P. F. GIRARD          3,490,720

V/STOL AIRCRAFT WITH VARIABLE GEOMETRY ROTOR/WING

Filed Nov. 26, 1968          5 Sheets-Sheet 1

INVENTOR
PETER F. GIRARD
BY Knox & Knox

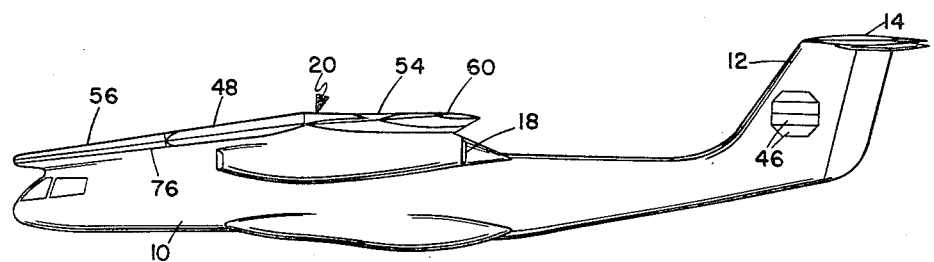
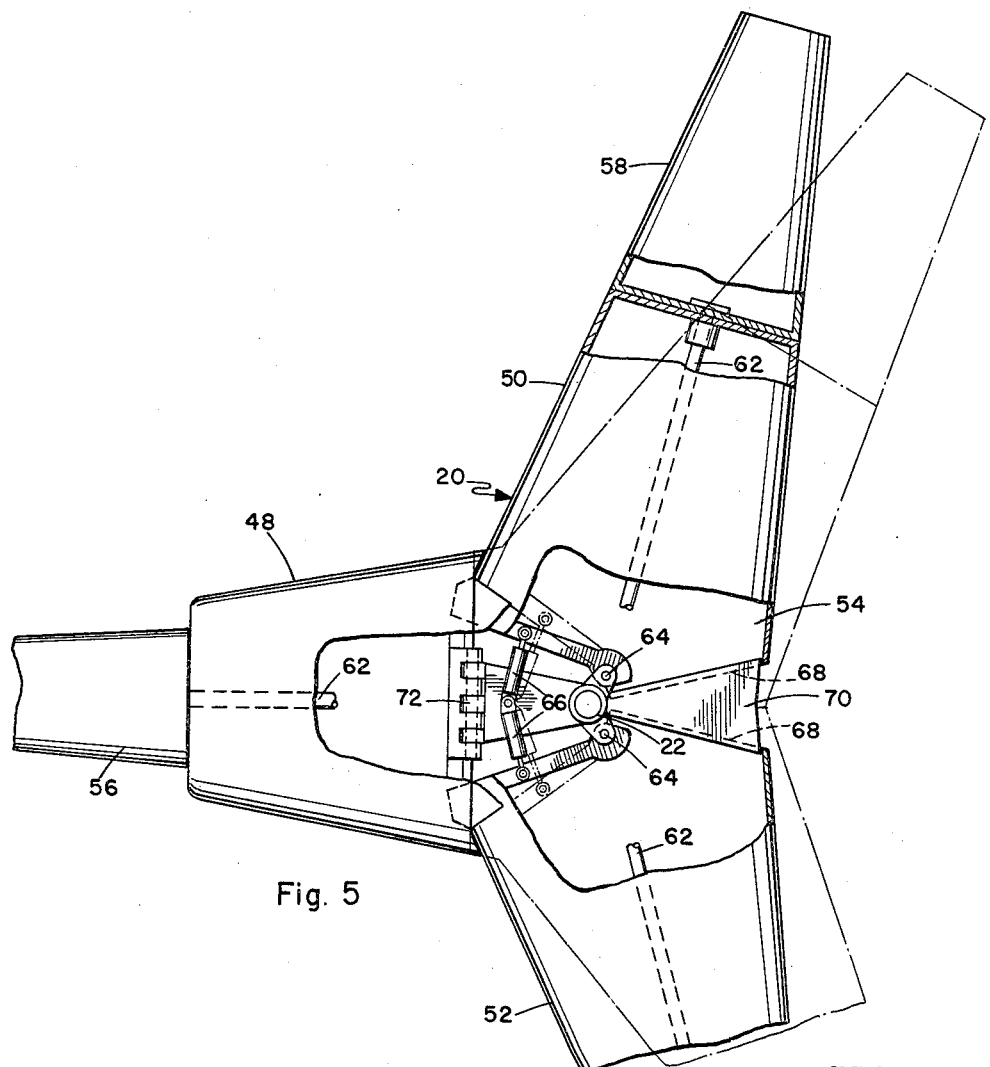

INVENTOR.
PETER F. GIRARD
BY
Knox & Knox

Jan. 20, 1970  P. F. GIRARD  3,490,720
V/STOL AIRCRAFT WITH VARIABLE GEOMETRY ROTOR/WING
Filed Nov. 26, 1968  5 Sheets-Sheet 5

INVENTOR.
PETER F. GIRARD
BY Knox & Knox

United States Patent Office 3,490,720
Patented Jan. 20, 1970

3,490,720
V/STOL AIRCRAFT WITH VARIABLE GEOMETRY ROTOR/WING
Peter F. Girard, La Mesa, Calif., assignor to The Ryan Aeronautical Co., San Diego, Calif.
Continuation-in-part of application Ser. No. 676,112, Oct. 18, 1967. This application Nov. 26, 1968, Ser. No. 786,531
Int. Cl. B64c 27/24, 3/40
U.S. Cl. 244—7   7 Claims

ABSTRACT OF THE DISCLOSURE

The aircraft uses a three armed wing in which the tip portions are pivotal to act as rotor elements when the wing is rotated about a central axis, the rotor being controllable in the general manner of a rigid rotor helicopter to provide the aircraft with vertical or short take-off and landing (V/STOL) capability at a low disc loading. For forward flight the wing is stopped with one arm along the longitudinal axis of the aircraft and the other two extending laterally on opposite sides, the lateral arms then being swung to substantially straight wing configuration to reduce the sweep angle, increase the effective aspect ratio of the wing and move the aerodynamic center of the wing, so that the aircraft is more efficient in cruising flight at a high wing loading.

CROSS REFERENCE TO RELATED APPLICATION

The present disclosure is a continuation-in-part of application Ser. No. 676,112, filed Oct. 18, 1967, now abandoned and entitled V/STOL Aircraft With Variable Geometry Rotor/Wing.

BACKGROUND OF THE INVENTION

The present invention relates to aircraft and specifically to a V/STOL aircraft with a variable geometry rotor/wing.

The most common type of V/STOL aircraft, the helicopter, is limited in its maximum forward speed by the large rotor, which presents considerable drag. Helicopters have been developed with auxiliary fixed wings for primary lift in forward flight using a propulsion system in addition to the rotor, which is then allowed to autorotate, or is driven at low power to minimize drag. The rotor does not contribute appreciably, if at all, to lift in crusing flight and is thus an unnecessary load. Other types have been proposed in which the rotor is stopped and retracted to minimize drag, but again the inoperative rotor is unwanted load. A further type of V/STOL aircraft combines the rotor and wing to operate as a rotor in one mode and to function as the primary or sole fixed lifting surface in cruising flight. Examples of such aircraft are shown and described in U.S. Patents 3,025,022 entitled Delta Wing Heliplane, 3,146,970, entitled Heliplane and 3,159,360 entitled Jet powered VTOL Aircraft. In each of these aircraft the rotor/wing is basically a three armed wing with a large center body and tip portions which are pivoted to act as controllable pitch rotor blade elements, the characteristics being substantially those of a rigid rotor helicopter. In stopped position one arm extends longitudinally along the aircraft and the other two extend laterally on opposite sides, the lateral tip portions then becoming roll control surfaces. This type of wing, when fixed, has aerodynamic characteristics somewhat similar to those of a delta wing. For many purposes, particularly in very high speed flight, this wing is efficient, but for greater efficiency over a wide range of cruising speeds, a wing of higher aspect ratio than a delta is considerably more efficient.

SUMMARY OF THE INVENTION

The aircraft described herein includes all the advantages of the combined rotor and wing aircraft, plus the capability of changing the geometry of the wing in stopped position to a high aspect ratio configuration. When the wing is stopped the lateral arms are swung to a substantially straight wing position and the longitudinal arm is lowered to fit closely into the airframe configuration to minimize drag. The system is adaptable to a variety of airframe and propulsion combinations and makes it possible to utilize effectively the desirable features of both rotary and fixed wing aircraft over a wide performance range.

BRIEF DESCRIPTION OF THE DRAWINGS

FIGURE 4 is a side elevation view of the aircraft with the wing in fixed configuration;

FIGURE 5 is an enlarged top plan view of the wing, partially cut away to reveal the variable geometry mechanism;

Similar characters of reference indicate similar or identical elements and portions throughout the specification and throughout the views of the drawings.

DESCRIPTION OF THE PREFERRED EMBODIMENT

The aircraft shown is a turbojet powered transport type and is merely an example, the airframe configuration and propulsion means being dependent on the purpose and performance range required. The structure, where shown, is somewhat diagrammatic, since there can be considerable variation in detail design and materials used.

Figure 7:
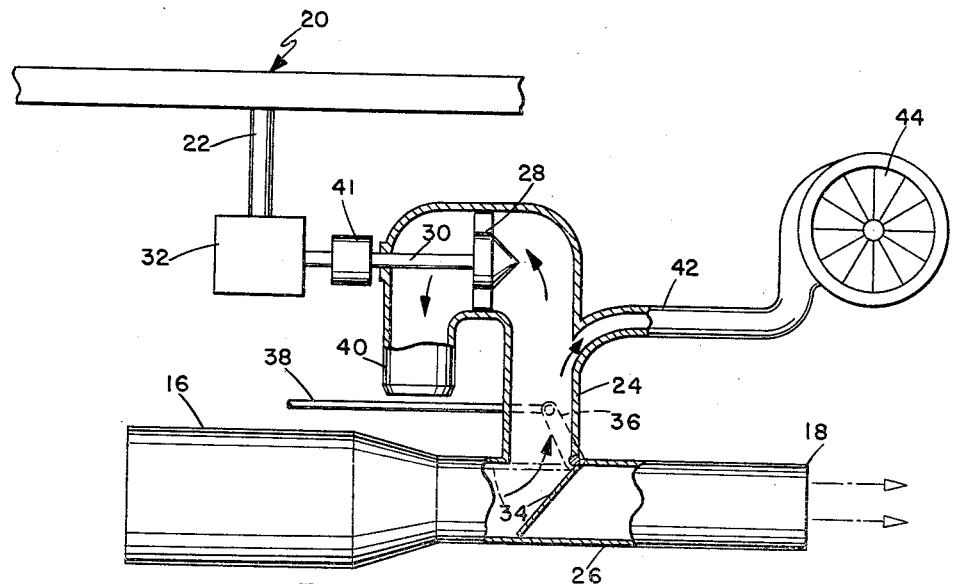
FIGURE 7 is a diagrammatic view of the rotor drive system.

The aircraft shown in FIGURES 1–4 has a fuselage 10, at the rear end of which is an upright fin 12 with a horizontal stabilizer 14 on top of the fin. Mounted on or in the fuselage are two turbojet engines 16 having rearwardly opening propulsion nozzles 18 for normal thrust in cruising flight. On top of the fuselage is the wing 20, which is rotatable on a central, substantially vertical shaft 22. One suitable system for rotating the wing is shown in FIGURE 7, wherein a duct 24 leads from the tailpipe 26 of jet engine 16 to a turbine 28 on a shaft 30, which is coupled through a gearbox 32 to shaft 22. One engine 16 is shown, but obviously duct 24 could be bifurcated and conduct gases from both engines. In tailpipe 26 is a diverting valve 34 pivotally mounted to swing between a position covering the opening of duct 24 and another position blocking tailpipe 26, the valve being controlled by an arm 36 and an actuating rod 38 leading to a suitable pilot operated control. When valve 34 is blocking tailpipe 26, the engine exhaust gases drive turbine 28 and rotate the wing, the gases exhausting through a nozzle 40 which can be directed downwardly from the aircraft to add to vertical thrust. A clutch 41 may be installed in shaft 30 for complete disengagement of the wing from the drive means. From duct 24 a secondary duct 42 leads to a tip turbine driven anti-torque fan 44 in fin 12, which is provided with movable vanes 46 on both sides of the fin to close the fan opening when not in use. Details of such a fan installation and its operation are shown and described in U.S. Patent No. 3,179,353, which shows a horizontally mounted fan in the tail assembly. The vertically mounted fan 44 is similar in structure, operation and control but is used for yaw control and anti-torque control in the manner of a helicopter tail rotor. Other means for driving the wing and providing torque control may be used, depending on the propulsion system and type of aircraft.

The wing 20 is a three armed structure which, in its fixed position, has a forward arm 48, a right arm 50 and a left arm 52 forming a large center body 54. At the outer ends of the arms are tip portions which are extensions of the arms, the forward tip portion 56, right tip portion 58 and left tip portion 60 each being pivotally mounted on its spanwise axis by a generally radial hinge rod 62. The arms and tip portions have generally lenticular airfoil configurations for efficiency in both rotary and fixed wing modes. As illustrated, the forward tip portion 56 is somewhat narrower than the others and the front end of forward arm 48 is streamlined to minimize drag and to interfit with the fuselage more efficiently in fixed position. The rotary lift characteristics and weight distribution are such that the wing is balanced in all respects about its axis of rotation. However, all three arms and tip portions could be identical for simplicity of structure.

The arms 50 and 52 are attached to shaft 22 by hinges 64 spaced slightly outboard of the shaft along the spanwise axes of the respective arms, the axes of said hinges being substantially parallel to the axis of the shaft so that the arms swing from front to rear in the general plane of the wing. The arms are actuated by synchronized jacks 66, or similar actuating means, to swing through their limited range of travel. In the rearmost position, as in full line in FIGURE 2, the spanwise axes of the right and left arms are at substantially 120 degrees with respect to the spanwise axis of forward arm 48, so that the wing is generally symmetrical for rotation. In this position the inboard edges 68 of arms 50 and 52 are together, forming an unbroken center body 54. When arms 50 and 52 are swept forward, as in full line in FIGURE 5, a fixed web fairing 70 fills the gap between edges 68. A sweep angle change of about 15 degrees is indicated, bringing the arms to a straight wing position, or with the full span trailing edge substantially straight and a slight sweep back on the leading edges as shown, but this can vary according to requirements.

Figure 9:
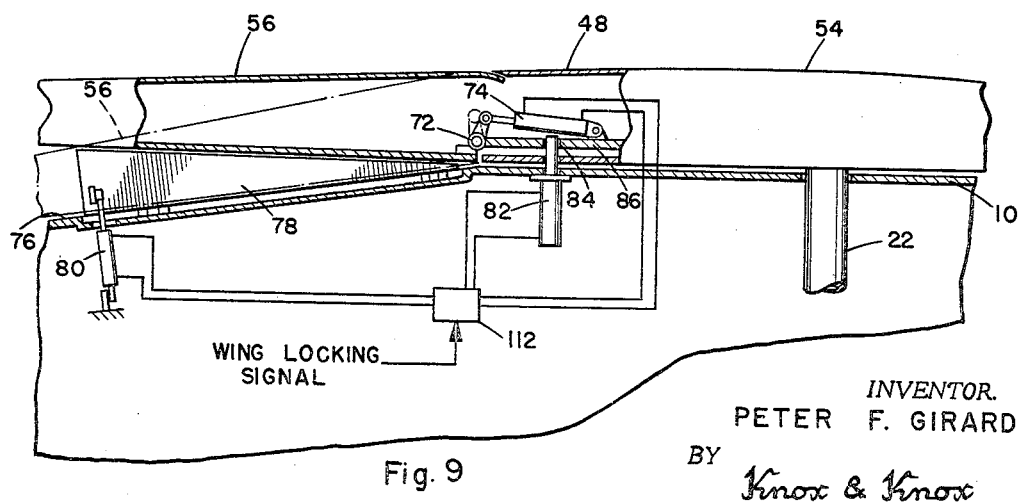
FIGURE 9 is a partially sectioned and enlarged side elevation view of the wing center section; showing the wing locking and forward arm actuating means.

Forward arm 48 is attached to the center body 54 by a chordwise hinge 72, on which the forward arm can swing vertically through a limited range. The forward arm is actuated by a jack 74, or similar means, as in FIGURE 9, the jack being omitted from FIGURE 5 for clarity. In the raised position, or rotary wing position shown in full line in FIGURE 9, the forward arm 48 has the same relationship to shaft 22 as the arms 50 and 52, a small positive dihedral or cone angle being indicated. When lowered, the forward arm 48 and forward tip portion 56 rest on a close fitting longitudinal platform 76 on top of fuselage 10, to blend as closely as possible with the fuselage and so minimize drag in forward flight. To improve airflow characteristics in transition flight, when the wing is rotating but the aircraft has forward speed, two fairing panels 78 are pivotally mounted in platform 76 to swing upwardly into a V-shaped configuration with its apex forward to deflect the airflow outwardly between the platform and the wing. Fairing panels 78 are raised and lowered by jacks 80, or the like, in cooperation with jack 74, as indicated in FIGURE 9. An indexing lock 82 engages in a socket 84 in a portion of the center body structure 86 to hold the wing in fixed position. Other types of locking means may be used and could be combined with means to hold the forward arm 48 down on platform 76, in addition to the jack 74. The specific arrangement will depend on the aircraft and the loads involved. An alternative mechanism for the same purpose is shown in U.S. Patent No, 3,146,970, as an example.

Figure 1:
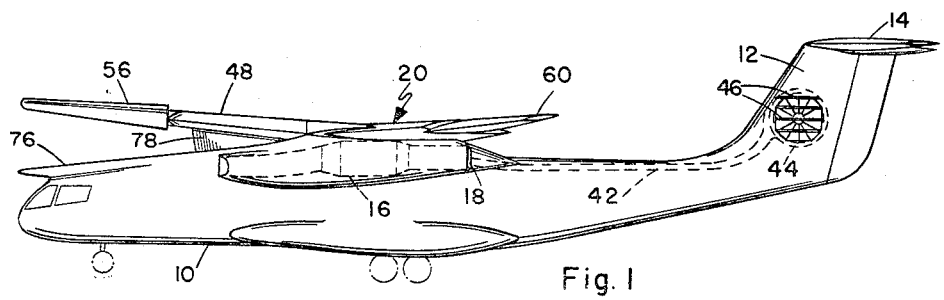
FIGURE 1 is a side elevation view of a typical aircraft, with the wing in the rotor configuration.
Figure 2:
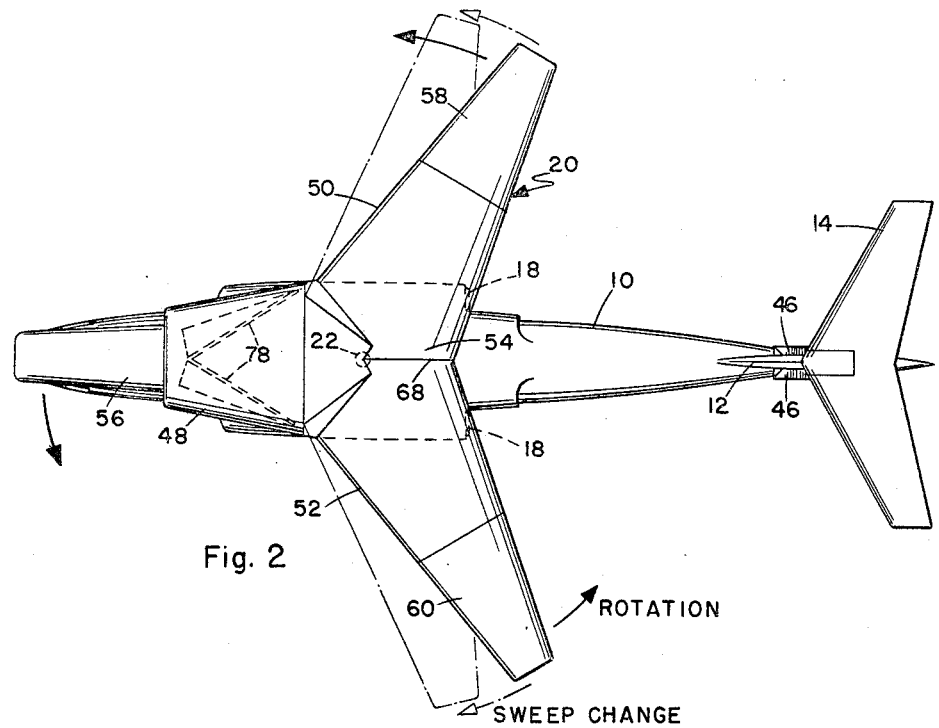
FIGURE 2 is a top plan view showing the rotary and fixed positions of the wings.
Figure 3:
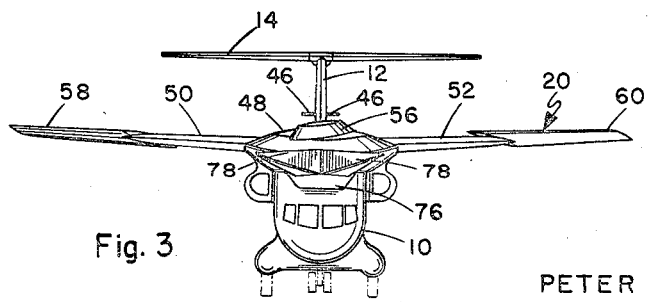
FIGURE 3 is a front elevation view of the aircraft in the configuration of FIGURE 1.
Figure 6:
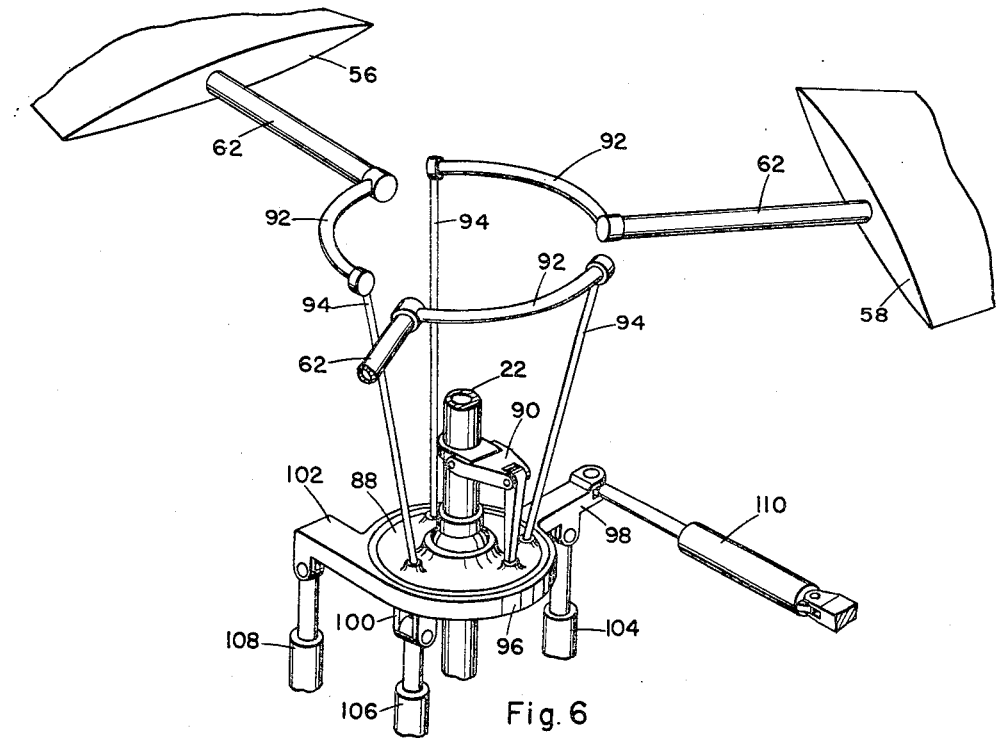
FIGURE 6 is a perspective view of a portion of a suitable rotor control system.
Figure 8:
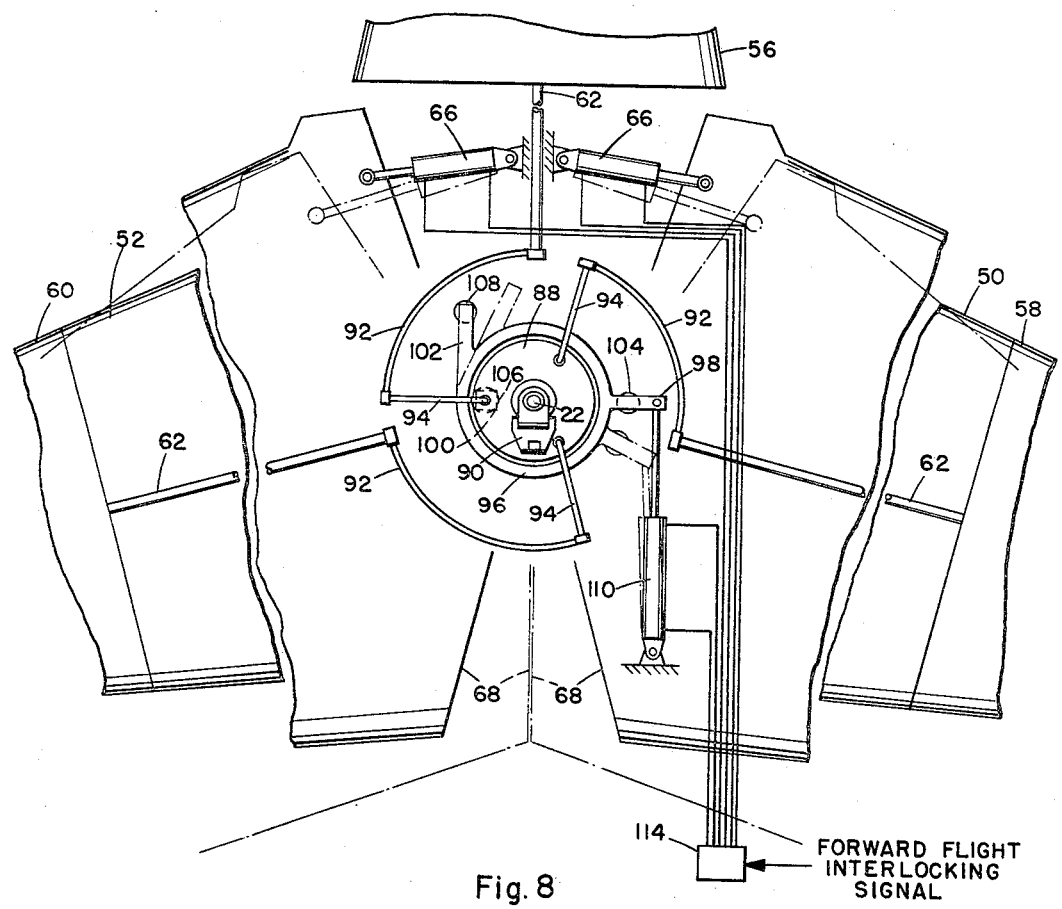
FIGURE 8 is a diagram of the variable geometry and wing control mechanisms in rotary adn fixed wing modes.

Also shown in the above mentioned U.S. patent is a control system which operates the rotating wing in the manner of a helicopter rotor and provides roll control with the fixed wing. This control system is especially suitable for the present aircraft and portions are shown in FIGURES 6 and 8 to facilitate the description.

On shaft 22 is an axially slidable and universally pivotal swash plate 88 coupled to the shaft by a hinged knuckle 90 to rotate therewith. Each hinge rod 62 has an actuating arm 92 extending in the direction of rotation of the wing and from each actuating arm a connecting rod 94 is connected to swash plate 88, both ends of the connecting rods having ball jointed ends to accommodate the necessary motions. Surrounding swash plate 88 is a control ring 96, in which the swash plate is rotatable. Extending laterally from one side of control ring 96 is a roll control arm 98 and diametrically opposite is a hinge fitting 100 on the underside of the control ring, while projecting forwardly from the control ring is a pitch control arm 102. Coupled to roll control arm 98 is a jack 104, coupled to hinge fitting 100 is a similar jack 106 and a further jack 108 is coupled to pitch control arm 102. All of the three jacks have substantially vertical strokes. When all three jacks are operated equally in a common direction, the entire swash plate assembly slides on shaft 22 and the three wing tip portions are rotated equally to provide collective pitch action. Operated independently the jacks provide cyclic pitch control as required. The complete operation of the system and its connection to the aircraft controls is fully described in U.S. Patent No. 3,146,970.

A phase control jack 110 is coupled to roll control arm 98 and operates generally horizontally to rotate control ring 96 through a predetermined angle. In the broken line position in FIGURE 8 the control ring 96 is positioned to provide helicopter type control for the rotating wing. When phase control jack 110 is actuated to rotate control ring 96 to the full line position, jacks 106 and 108 are deactivated, as described in the above mentioned U.S. patent, leaving only jack 104 operative. Operation of jack 104 will raise and lower roll control arm 98, the swash plate pivoting on hinge fitting 100. Front tip portion is coupled to the swash plate 88 over hinge fitting 100 and is thus unaffected. Tip portions 58 and 60, however, are both coupled to the swash plate on the side adjacent roll control arm 98 and are thus rotated by motion of the swash plate. Since the actuating arms 92 to tip portions 58 and 60 are on opposite sides of their respective axes of rotation, the tip portions will rotate in opposite directions in the manner of ailerons when the wing is fixed.

Various types of control systems may be used to initiate the various functions, either individually or in sequence according to an automatic or semi-automatic program. The functions are best understood from the following description of a typical flight from vertical take-off, through transition to forward flight, return to hovering and finally a vertical landing.

With the wing arms 50 and 52 swept back, forward arm 48 raised, fairing panels 78 raised and lock 82 released, the valves 34 are moved to block tailpipes 26 and divert the engine exhaust gases through turbine 28 to rotate the wing. Phase control jack 110 is actuated to put the swash plate mechanism in vertical flight mode and, when the wing is rotating at a suitable speed, the aircraft is lifted in the manner of a helicopter. The vanes 46 of the tail fan unit 44 can be coupled to operate with the wing sweep change means, or may be operated by any suitable means to open for vertical flight and close when the wing is stopped. At a suitable altitude, or in conjunction with the take-off action, cyclic pitch is applied to propel the aircraft forward. Fan unit 44 provides directional or yaw control, either by control of vanes 46 or by power modulation to the fan, the technique being well known in the ducted fan art. When a predetermined forward speed has been reached one or both of the valves 34 are operated to allow some exhaust gases to escape through tailpipes 26 and add to the forward speed. At the same time the power to the wing drive is reduced and the wing reduces its rotational speed. The wing continues to develop lift in autorotation as forward speed increases, and the conventional tail control surfaces become effective. Continued movement of valves 34 finally blocks ducts 24 and all engine thrust is applied to forward propulsion. As the wing comes to a stop the lock 82 is engaged and phase control jack 110 is operated to put the control of tip portions 58 and 60 into the aileron or roll control mode. Fairing panels 78 are then retracted and the forward panel 48 lowered. Jacks 66 are actuated to sweep the arms 50 and 52 forward and the aircraft is in fixed wing cruising flight condition.

For purposes of illustration, a control unit 112, actuated by a wing locking signal, is indicated in FIGURE 9 for controlling the wing locking and lowering of the fairing panels and forward wing arm. In FIGURE 8 a control unit 114, actuated by a forward flight interlocking signal, controls the rotary and fixed wing phases of the control system and the wing sweep angle changes. The sequence of operations can vary to some extent and the actual controls will depend on the type of actuators, rapidity of operations and related factors of specific aircraft.

To land the aircraft, forward speed is reduced, the arms 50 and 52 are swept back and forward arm 48 raised, together with fairing panels 78. With lock 82 released the valves 34 are moved to divert exhaust gases and rotate the wing, the phase control jack 110 being actuated to move the control system to rotor pitch control mode. Alternatively, the rotor can be started by autorotation, utilizing the air flow from forward flight. Cyclic pitch and thrust are controlled to bring the aircraft to a hovering position or to a low enough forward speed from which a substantially vertical descent can be made, in the manner of a helicopter, until the aircraft lands.

Figure 10:
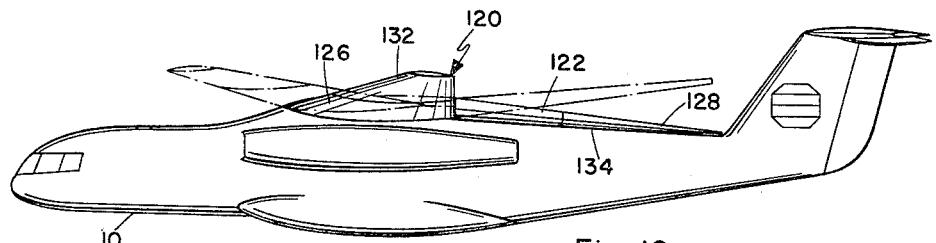
FIGURE 10 is a side elevation view of an aircraft with an alternative stopped wing position.
Figure 11:
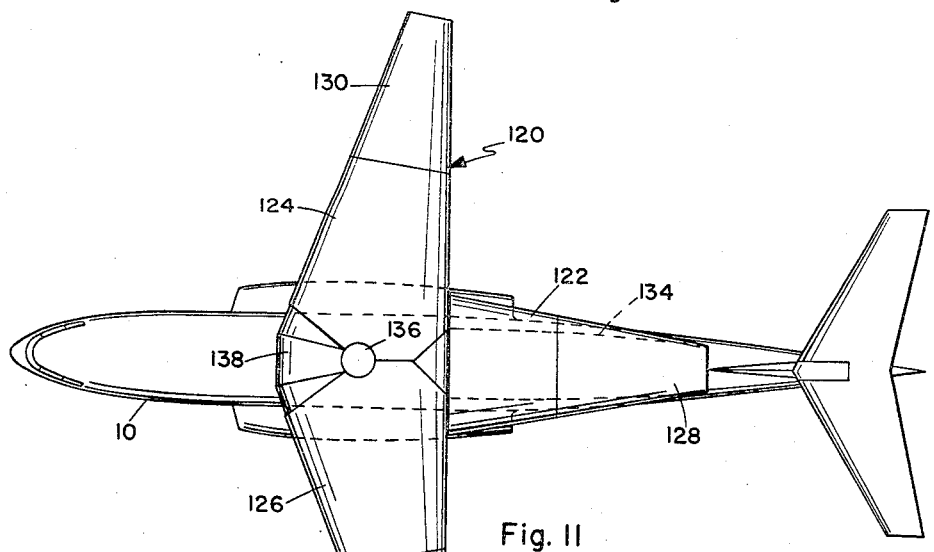
FIGURES 11 is a plan view of the aircraft of FIGURE 10, with the wing stopped position.
Figure 12:
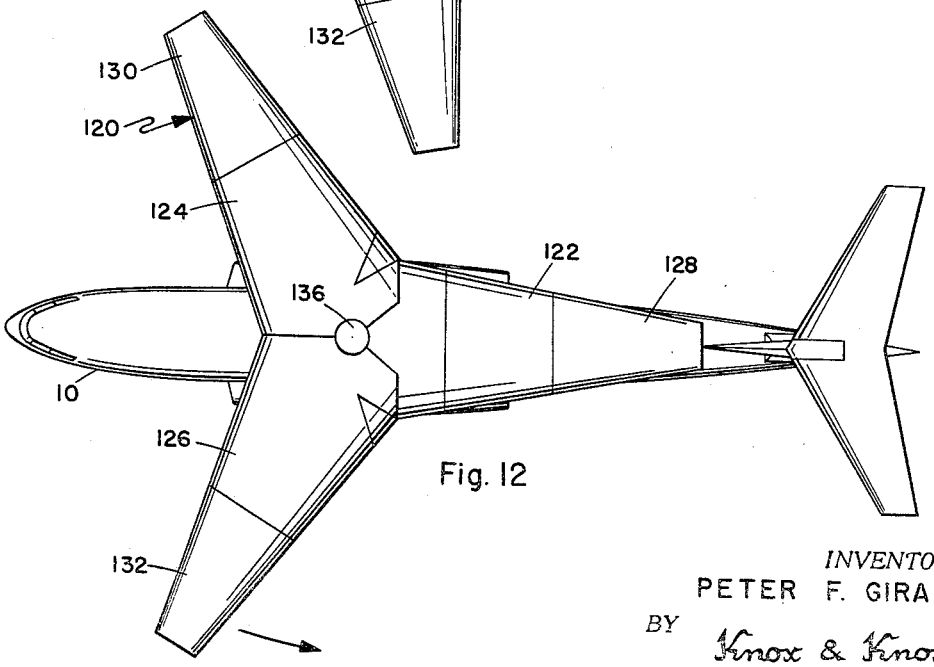
FIGURE 12 is a plan view with the wing in rotary configuration.

An alternative stopped wing configuration, which may be more suitable for some aircraft, is shown in FIGURES 10-12. The basic aircraft illustrated differs only in minor details from that described above, and all propulsion and control system features remain the same. However, the wing is designed to stop with one arm extending longitudinally rearwardly, rather than forward.

The wing 120 has a rear arm 122, a right arm 124 and a left arm 126, in the stopped position, with movable tip portions 128, 130 and 132, respectively. Rear arm 122 is hinged to swing vertically in a manner similar to arm 48, but seats into a longitudinal recessed platform 134 on top of the rear fuselage of the aircraft, as in the full line position in FIGURE 10. With the wing 120 stopped but still in rotor configuration, as in FIGURE 12 and the broken line position of FIGURE 10, arms 124 and 126 are in swept forward positions on opposite sides of the aircraft. For cruising flight these arms 124 and 126 are swept back about a central pivot 136 to the straight wing position of FIGURE 11, a fixed web fairing 138 filling the gap and forming a leading edge structure between the separated arms. The arrangement and action is similar to that already described and differs only in the direction of sweep change with respect to the aircraft.

For light loads, or where space permits, the aircraft can be operated as a normal fixed wing aircraft. Alternatively, the wing can be allowed to autorotate or be partially powered to provide short take-off and landing aid.

The autorotation capability is a safety feature in the event of a power failure, since the rotating wing with cyclic pitch control operative will enable the aircraft to be landed safely.

The use of the wing as a fixed lifting surface and as a lifting rotor represents maximum use of the aerodynamic capabilities. In fixed position the major portion of the wing generates lift, while in vertical and transition flight virtually all of the wing contributes to lift. The variable pitch tip portions generate most of the lift in rotation, as a rotor, but the center body arms are cambered airfoils in a relatively moving airstream caused by rotation and add substantially to total lift. There are no auxiliary surfaces or drag producing components, as in a compound helicopter or similar type of aircraft. In the vertical flight mode the large swept area of the rotating wing makes it practical to operate the aircraft at low disc loadings on the order of 10 to 15 pounds per square foot, comparable to efficient helicopters. In high speed forward flight with the wing fixed, wing loading can be on the order of 50 pounds per square foot. This is a very efficient wing loading for high speed cruising flight, the apparently small fixed wing being ample to support the aircraft. Normal fixed wings are usually undesirably large to provide sufficient lift at low speeds during take-off and landing. By sweeping the wing arms to a substantially straight fixed wing position, with either of the configurations shown, the aspect ratio is effectively increased to a more desirable configuration, an aspect ratio of 6 or greater being quite practical. In addition, the sweep angle change moves the aerodynamic center of the wing to a more suitable position for forward flight. This is opposite to the usual concept of a variable sweep wing, which extends in a near straight wing or minimum sweep back position for low speed flight and swings to greater sweep back positions as speed increases. In rotation the wing acts as a rigid helicopter rotor and the center of gravity location relative to the aerodynamic center of pressure is not unduly critical.

It is understood that minor variation from the form of the invention disclosed herein may be made without departure from the spirit and scope of the invention, and that the specification and drawings are to be considered as merely illustrative rather than limiting.

I claim:

1. In an aircraft of the type having an airframe, a wing mounted on said airframe for rotation about a central axis perpendicular to the general plane of the wing, a source of power connected to rotate the wing, said wing havin a center section with three radially extending arms, means to lock said wing in a fixed position in which said arms comprise a longitudinally extending arm and right and left laterally extending arms, each of said arms having a tip portion pivotally mounted for rotation about a substantially radial axis of the respective arm and constituting a lifting rotor element, and control means operatively connected to said tip portions to vary the inclination thereof cyclically and collectively relative to said arms as the wing rotates, the improvement comprising:

hinge means connecting said lateral arms to said center section to swing from front to rear in the general plane of the wing;

and actuating means operable in the fixed wing position and connected to said lateral arms to move the lateral arms between low speed rotary wing positions, in which the radial axes of the three wing arms are equally angularly spaced about the wing rotational axis, and fixed wing positions for high speed cruising at a predetermined reduced angle of sweep relative to the longitudinally extending arm, at which the aspect ratio of the wing is increased.

2. Structure according to claim 1, and further including:

hinge means connecting said longitudinally extending arm to said center section to swing vertically about a substantially chordwise axis;

and actuating means connected to said longitudinally extending arm to move the same between a lowered, fixed wing position and a raised, rotary wing position clear of the airframe.

3. Structure according to claim 2, wherein said airframe has a platform portion on which said longitudinally extending arm and tip portion seal closely in the fixed wing position.

4. The structure of claim 3, wherein said platform portion is on the forward portion of said aircraft and said longitudinally extending arm is forward in the fixed wing position.

5. Structure according to claim 4, and including fairing panels on said platform, and means to raise and lower said fairing panels in conjunction with the raising and lower of said forward arm, the raised panels forming a substantially V-shaped fairing structure with the apex thereof extending forwardly between said platform portion and said wing.

6. The structure of claim 3, wherein said platform portion is on the rear portion of said airframe and said longitudinally extending arm is rearward in the fixed wing position.

7. Structure according to claim 1, wherein said lateral arms have substantially chordwise inboard edge portions which abut in the rotary wing position; and said center section having a web portion which extends between said inboard edge portions in the fixed wing position of said lateral arms.

References Cited
UNITED STATES PATENTS

| | | | |
|---|---|---|---|
| 2,980,366 | 4/1961 | Wallis | 244—46 |
| 3,146,970 | 9/1964 | Girard | 244—7 |
| 3,279,721 | 10/1966 | Dethman | 244—46 |

MILTON BUCHLER, Primary Examiner

J. L. FORMAN, Assistant Examiner

U.S. Cl. X.R.

170—160.25; 244—46